(12) United States Patent
Karacali-Akyamac et al.

(10) Patent No.: US 7,697,460 B2
(45) Date of Patent: Apr. 13, 2010

(54) EVALUATING FEASIBLE TRANSMISSION PATHS IN A PACKET NETWORK

(75) Inventors: Bengi Karacali-Akyamac, Bridgewater, NJ (US); Mark John Karol, Fair Haven, NJ (US); P Krishnan, North Plainfield, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 339 days.

(21) Appl. No.: 11/765,242

(22) Filed: Jun. 19, 2007

(65) Prior Publication Data

US 2008/0080540 A1 Apr. 3, 2008

Related U.S. Application Data

(60) Provisional application No. 60/827,413, filed on Sep. 28, 2006.

(51) Int. Cl.
H04L 12/56 (2006.01)

(52) U.S. Cl. .................. 370/256; 370/400; 370/409; 370/238

(58) Field of Classification Search .................. 370/351, 370/428, 370
See application file for complete search history.

(56) References Cited

U.S. PATENT DOCUMENTS

| | | |
|---|---|---|
| 6,473,405 B2 | 10/2002 | Ricciulli |
| 6,515,977 B2 | 2/2003 | Bi et al. |
| 6,594,235 B1 | 7/2003 | Rochberger et al. |
| 6,732,189 B1 | 5/2004 | Novaes |
| 6,748,433 B1 | 6/2004 | Yaakov |
| 6,798,765 B2 | 9/2004 | Larsson |

(Continued)

FOREIGN PATENT DOCUMENTS

EP   1 610 496 A1   12/2005

(Continued)

OTHER PUBLICATIONS

Peter Pham , "Performance Analysis of REactive Shortest Path and Multi-path Routing Mechanism with Load Balance", 2003.*

(Continued)

Primary Examiner—Dang T Ton
Assistant Examiner—Pamit Kaur
(74) Attorney, Agent, or Firm—DeMont & Breyer, LLC

(57) ABSTRACT

A technique is disclosed that attempts to improve the evaluation of a network path's signal quality, as well as the selection of a network path for transmission purposes, without some of the costs and disadvantages of doing so in the prior art. In accordance with the illustrative embodiment, a node with access to the packet network, such as a VoIP telephone endpoint, evaluates the quality of service that is associated with each of multiple network paths. The evaluation process is iterative, in which the number of candidate paths is successively reduced from one iteration of the technique to the next. The multiple paths that remain as candidates in any given iteration are evaluated concurrently and at an evaluation bit rate that i) is less than the full transmission rate of the real-time traffic (VoIP) packets to be sent and ii) varies as a function of the number of candidate paths remaining under consideration.

27 Claims, 7 Drawing Sheets

U.S. PATENT DOCUMENTS

| | | | |
|---|---|---|---|
| 6,914,883 | B2 | 7/2005 | Dharanikota |
| 2002/0095489 | A1 | 7/2002 | Yamagami |
| 2003/0039212 | A1 | 2/2003 | Lloyd et al. |
| 2003/0108059 | A1 | 6/2003 | Yew et al. |
| 2003/0161265 | A1 | 8/2003 | Cao et al. |
| 2003/0204616 | A1 | 10/2003 | Billhartz et al. |
| 2004/0042473 | A1* | 3/2004 | Park et al. .................. 370/408 |
| 2004/0100949 | A1 | 5/2004 | Bennett |
| 2005/0081082 | A1 | 4/2005 | Brodie et al. |
| 2006/0221844 | A1 | 10/2006 | Subramanian et al. |

FOREIGN PATENT DOCUMENTS

| | | |
|---|---|---|
| EP | 1 701 492 A1 | 9/2006 |
| WO | 02080462 A1 | 10/2002 |

OTHER PUBLICATIONS

Shu Tao, Improving VOIP Quality throuhg Path Switching, 2005.*

Shu Tao et al: "Improving VoIP quality through path switching"; Infocom 2005. 24th Annual Joint Conference of the IEEE Computer and Communication Societies. Proceedings IEEE Miami, FL, USA Mar. 13-17, 2005, pp. 2268-2278, XP010829264; ISBN: 0-7803-8968-9.

Shu Tao et al: "Exploring the performance benefits of end-to-end path switching"; Network Protocols, 2004. ICNP 2004. Proceedings of the 12th IEEE International Conference on Berlin, German Oct. 5-8, 2004, pp. 304-315, XP010734832; ISBN: 0-7695-2161-4.

Extended European Search and Written Opinion.

Savin, Daniela, "CA Application No. 2,559,621 Office Action Apr. 17, 2009", Publisher: CIPO, Published in: CA.

Kreppel, J "EP Application No. 06 25 50165 - 2416 Office Action May 10, 2007", Publisher: EPO, Published in: EP.

Kreppel, Jan, "EP Application No. 06 25 5016.5 - 2416 European Search Report Dec. 21, 2006", publisher: EPO, Published in: EP.

Ghowrwal, Omar J., "U.S. Appl. No. 11/329,933 Office Action Dec. 29, 2008", Publisher: USPTO, Published in: US.

Ghowrwal, Omar J., "U.S. Appl. No. 11/329,933 Office Action Feb. 3, 2010", Publisher: USPTO, Published in: US.

Ghowrwal, Omar J., "U.S. Appl. No. 11/329,933 Office Action Jun. 18, 2009", Publisher: USPTO, Published in: US.

Bayaa, Hassan, "CA Application No. 2,603,796 Office Action Nov. 3, 2009" Publisher: CIPO, Published in: CA.

Hopkins, Matthew A., "U.S. Appl. No. 11/861,079 Office Action Jan. 20, 2010" Publisher: USPTO, Published in: US.

Hopkins, Matthew A., "U.S. Appl. No. 11/861,079 Office Action Sep. 21, 2009" Publisher: USPTO, Published in: US.

* cited by examiner

EVALUATING FEASIBLE TRANSMISSION PATHS IN A PACKET NETWORK

FIELD OF THE INVENTION

The present invention relates to telecommunications in general, and, more particularly, to evaluating the signal quality in packet network transmission paths.

BACKGROUND OF THE INVENTION

FIG. 1 depicts a schematic diagram of a telecommunications network in the prior art, such as the Internet, which transports data packets from one node to another. Each endpoint, server, router, or other device that is capable of transmitting and/or receiving packets in the network is generically referred to as a "network node," or simply "node." A node that originates one or more packets, as part of a packet stream, is referred to as a "source node," and a node that acts as the terminus for a packet stream is referred to as a "destination node." For the purposes of this specification, a "network path" is defined as the physical transmission route between a pair of source and destination nodes in a network.

The service provided by a network path is characterized by its signal quality. An important aspect of signal quality is "quality of service," which, for the purposes of this specification, is defined as a function of one or more of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

In the transmission of any packet stream, there is a source node and a destination node. The two nodes can be the same type of device, such as two Voice-over-Internet-Protocol (VoIP) telephone clients, or can be different devices, such as a personal computer with a browser and a web server. Of course, the source node for one packet stream can be the destination node for another packet stream.

Some applications—for example, e-mail—are generally more tolerant of the quality of service provided by the network path, but some other applications—particularly VoIP telephony and streaming audio and video—are generally very sensitive. While some network paths provide quality-of-service guarantees, many others, including most of those through the Internet, do not. The result is that the provisioning of applications like telephony through the Internet can require transmitting some packets of a given packet stream across one network path and, as the quality of service changes, transmitting subsequent packets of the same stream across another network path, in order to maintain the required or preferred quality-of-service level. This requires evaluating the various possible network paths in a timely and efficient manner.

A technique exists of using what is referred to as a "relay node" to improve or maintain quality of service in a network that is without a quality-of-service guarantee. The relay node is positioned within the network between a source node and destination node, is addressable by the source node, and is able to relay traffic packets to the destination node. The relay node operates by forwarding certain packets received from a source node to the destination node that is specified by the source node. Relay nodes are discussed in U.S. patent application Ser. No. 11/201892, filed on Aug. 11, 2005, which is incorporated herein by reference.

One of the persistent and difficult problems in this area involves finding new relay nodes to use, quickly and efficiently, such as when the quality of service in a given path has degraded or because of a user-initiated or a network administrator-initiated change. In a first technique of the prior art, a new relay node is selected randomly. This has the advantage of being quick and of not creating excess probing traffic in the network, which can itself degrade the quality of service (QoS) of other traffic-carrying channels. This solution is disadvantageous, however, in that the random selection of a new relay node does not always yield a path through the new node with better QoS than before.

In a second technique of the prior art, a comprehensive examination of a number of randomly-selected relay nodes is conducted, followed by the selection of a path through a relay node found to have an acceptable QoS. Examining the nodes serially is typically too slow to be useful, unless an acceptable node is found early in the search. But examining the nodes in parallel typically creates enough congestion to adversely affect the QoS of other traffic-carrying channels in the network.

The need exists, therefore, for an invention that improves the evaluation of the signal qualities that are associated with multiple network paths, as well as the selection of one of those paths to handle the transmission of packets.

SUMMARY OF THE INVENTION

The present invention is a technique that attempts to improve the evaluation of a network path's signal quality, as well as the selection of a network path for transmission purposes, without some of the costs and disadvantages of doing so in the prior art. In accordance with the illustrative embodiment of the present invention, a node with access to the packet network, such as a VoIP telephone endpoint, evaluates the quality of service that is associated with each of multiple network paths. The evaluation process is iterative, in which the number of candidate paths is successively reduced from one iteration of the technique to the next. The multiple paths that remain as candidates in any given iteration are evaluated concurrently and at an evaluation bit rate that i) is less than the full transmission rate of the real-time traffic packets (e.g., VoIP packets, etc.) to be sent eventually and ii) varies as a function of the number of candidate paths remaining under consideration. The effect of performing the iterative technique of the illustrative embodiment is to progressively eliminate unsatisfactory paths from further consideration, while continuing to test those paths that appear promising.

In accordance with the illustrative embodiment, the network paths that are evaluated include paths that are specifiable by a source node for transferring one or more packets to a destination node. The source node using a specifiable path is in contrast to the node delegating the selection of a network path to the intermediate nodes in a packet network that rely entirely on routing tables. As those who are skilled in the art will appreciate, paths other than source node-specified paths can be evaluated as well.

An example of the illustrative embodiment technique is provided here. Initially, there are four candidate network paths addressable by a source node that is in the process of transmitting packets to a destination node. In the first iteration of the technique, the four network paths are simultaneously checked with quarter-rate packet stream signals that are known as "probing signals." Although the probing signals increase packet traffic in the network, there are only four of them, which only create as much congestion in the packet network as one full-rate signal. The results from the quarter-rate signals yield a good, but not perfect, indication of how a full-rate signal would perform; consequently, the results are not reliable enough to make an informed decision on which network path to select. Therefore, an additional set of evaluations is required, as part of a second iteration. In the second iteration, the two network paths with the best results from the first iteration are simultaneously checked with half-rate packet stream signals. Although the probing signals increase packet traffic in the network, there are only two of them, which only create as much congestion in the packet network as one full-rate signal. The candidate network path with the best result of this iteration is chosen as the new network path to handle a packet transmission. In this way, the technique of the illustrative embodiment selects a path quickly and reliably while mitigating the effects of additional traffic in the packet network.

In some embodiments, as shown in the example above, the evaluation bit rate is less than the normal transmission rate that is to be used in the transfer of the real-time packets, and the number of candidate paths that remain decreases with each successive iteration of the technique. By limiting the evaluation bit rate, the technique is better able to manage an overall evaluation bit budget for the probing bits. It will be clear, however, to those skilled in the art, after reading this specification, how to make and use embodiments of the present invention in which the evaluation bit rate for some of the probing signals can be greater than the normal transmission rate that is to be used in the transfer of the real-time packets, while staying within the overall evaluation bit budget.

It should be noted that some embodiments of the present invention can function without changing either i) the network routers' routing tables or ii) how the routers function. Furthermore, the node that evaluates the transmission paths can either have an address in the address space of the network or not. If it does not have an address in the address space of the network, the node can be either associated with another node that has an address in the address space of the network or not (i.e., it can be implemented as a "bump in a wire" which is invisible to the nodes in the network). Additionally, in some embodiments of the present invention, a relay node can be situated anywhere in a network (i.e., can be any directly addressable node in the network), and need have only one link to the network.

The illustrative embodiment of the present invention comprises: evaluating the signal quality associated with each network path $P_n$ of N network paths from a first node to a second node, in support of a first packet stream to be transmitted at a predetermined transmission rate from the first node to the second node, N being an integer greater than one and n being an integer between 1 and N, wherein the evaluation of at least one path $P_n$ involves transmitting packets at an evaluation rate that is i) less than the predetermined transmission rate and ii) inversely proportional to N, and wherein at least one path $P_n$ fails to provide a quality-of-service guarantee; selecting M network paths from the N network paths, M being a positive integer that has a value less than N, wherein the selection is based on the signal quality results from the evaluation of the N network paths; and transmitting, at the predetermined transmission rate, the first packet stream from the first node to a third node, wherein the third node is in selected path $P_s$ that is one of the M network paths.

DETAILED DESCRIPTION

Figure 1:
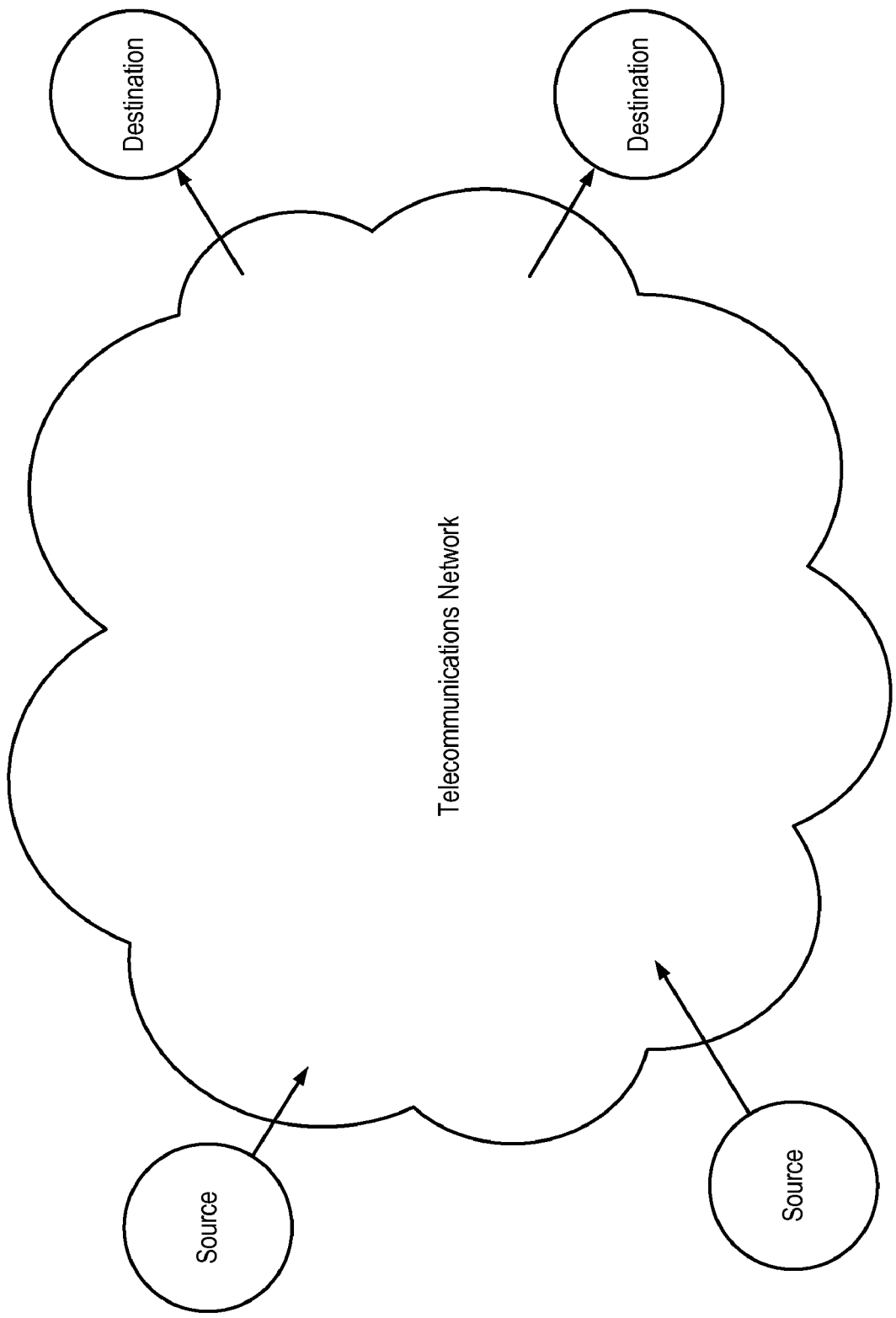
FIG. 1 depicts schematic diagram of a telecommunications network in the prior art, such as the Internet, which provides the service of transporting data packets from one node to another.
Figure 2:
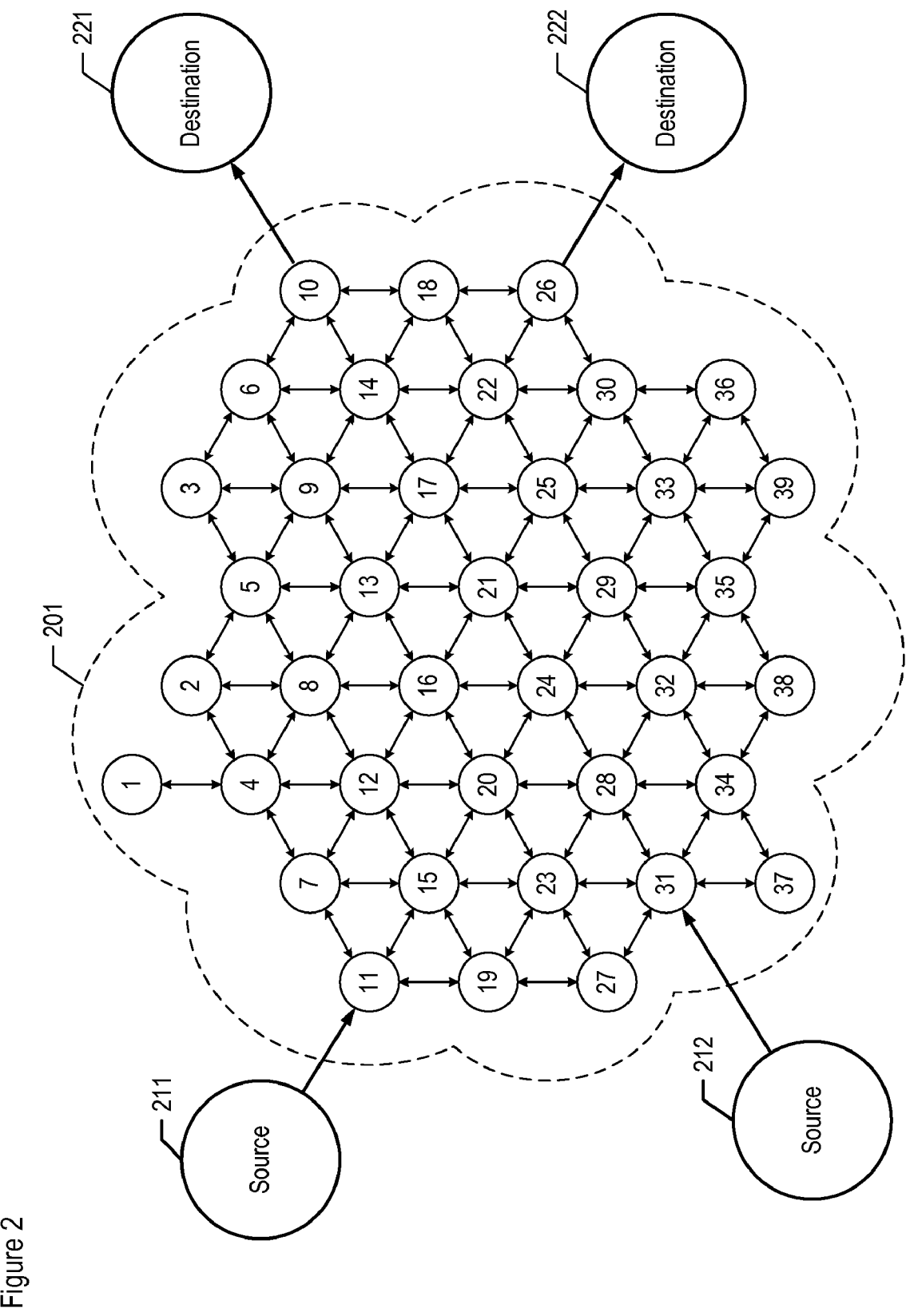
FIG. 2 depicts a schematic diagram of the salient components of an Internet Protocol-based network.

In order to describe the evaluation and selection technique of the illustrative embodiment, it is important to first establish an understanding of how a packet-based network operates, such as an Internet Protocol-based network. FIG. 2 depicts a schematic diagram of the salient components of such a network; in particular, it depicts the physical resources that compose the network. Network 201 does not provide a quality-of-service guarantee to any packet or stream of packets that it transports from a source node to a destination node, such as Real-time Transport Protocol (RTP) packets. Therefore, the provisioning of real-time services such as streaming audio and telephony, from a source node to a destination node, can be problematic without the present invention.

Network 201 comprises a plurality of nodes and their physical interconnections, arranged in the topology shown. It will be clear to those skilled in the art, however, after reading this specification, how to make and use alternative embodiments of the present invention with networks that comprise any number of nodes and have any topology. In particular, it will be clear to those skilled in the art, after reading this specification, how to make and use embodiments of the present invention with the Internet.

Nodes 211, 212, 221, and 222 depicted in FIG. 2 are Voice over Internet Protocol (VoIP) telephone endpoints, in accordance with the illustrative embodiment. However, it will be clear to those skilled in the art, after reading this specification, how to make and use alternative embodiments of the present invention in which some or all of the nodes are something other than VoIP endpoints.

For pedagogical purposes, the network paths that can be evaluated and selected for transmission purposes are assumed to exist within network 201. However, it will be clear to those skilled in the art, after reading this specification, how to make and use embodiments of the invention in which paths external to network 201 that are addressable by a source node, such as source node 211, can also be evaluated and selected for transmission purposes. For example, node 211 might be able to access a conditioned network that can provide a quality-of-service guarantee to any packet or stream of packets (e.g., RTP packets, etc.) that it transports. As a result, source node 211 might evaluate a path in the conditioned network (for example, if the particular QoS guarantee is unknown to the source node) and then select a path, using the technique of the illustrative embodiment, in order to determine how to transmit at least some packets in a packet stream.

Each node in network 201 is capable of receiving a packet and of forwarding that packet to another node, in well-known fashion, based on the destination address in the packet. For example, when node 11 receives a packet from source node 211, which packet contains node 26 as its destination address, node 11 must decide which of its adjacent nodes—nodes 7, 15, and 19—to forward the packet to.

Each node in network 201 decides which adjacent node to forward each packet to based on: (1) the destination address in the packet, and (2) a routing table in the node. For example, table 1 depicts a routing table for node 11, as is well known in the art.

TABLE 1

Routing Table for Node 11

| Destination node Address | Preferred Next Node | First Alternative Next Node | Second Alternative Next Node |
|---|---|---|---|
| 1 | 7 | 15 | 19 |
| 2 | 7 | 15 | 19 |
| 3 | 7 | 15 | 19 |
| ... | ... | ... | ... |
| 26 | 15 | 7 | 19 |
| ... | ... | ... | ... |
| 37 | 19 | 15 | 7 |
| 38 | 19 | 15 | 7 |
| 39 | 19 | 15 | 7 |

When all of the resources in the network are functioning and there is little network congestion, each node forwards a packet to the preferred next node listed in the routing table, in well-known fashion. For example, when node 11 receives a packet with the destination address 26, the preferred next node is node 15.

In contrast, when the preferred next node is not functioning or there is congestion at the preferred next node, the routing node can alternatively route the packet to the first alternative next node. For example, the first alternative next node at node 11 for a packet with the destination address 26 is node 7. And when the first alternative node is not functioning or there is congestion at the first alternative next node, the routing node can route the packet to the second alternative next node. The second alternative next node at node 11 for a packet with the destination address 26 is node 19.

When all of the resources in network 201 are functioning and there is little congestion, each node forwards a packet to the node listed as the entry for the preferred next node and the packet progresses from one preferred next node to the next and the next and so on until it reaches its destination node. For the purposes of this specification, the "primary nominal path" is defined as the chain of preferred next nodes from a source node to a destination node.

Figure 3:
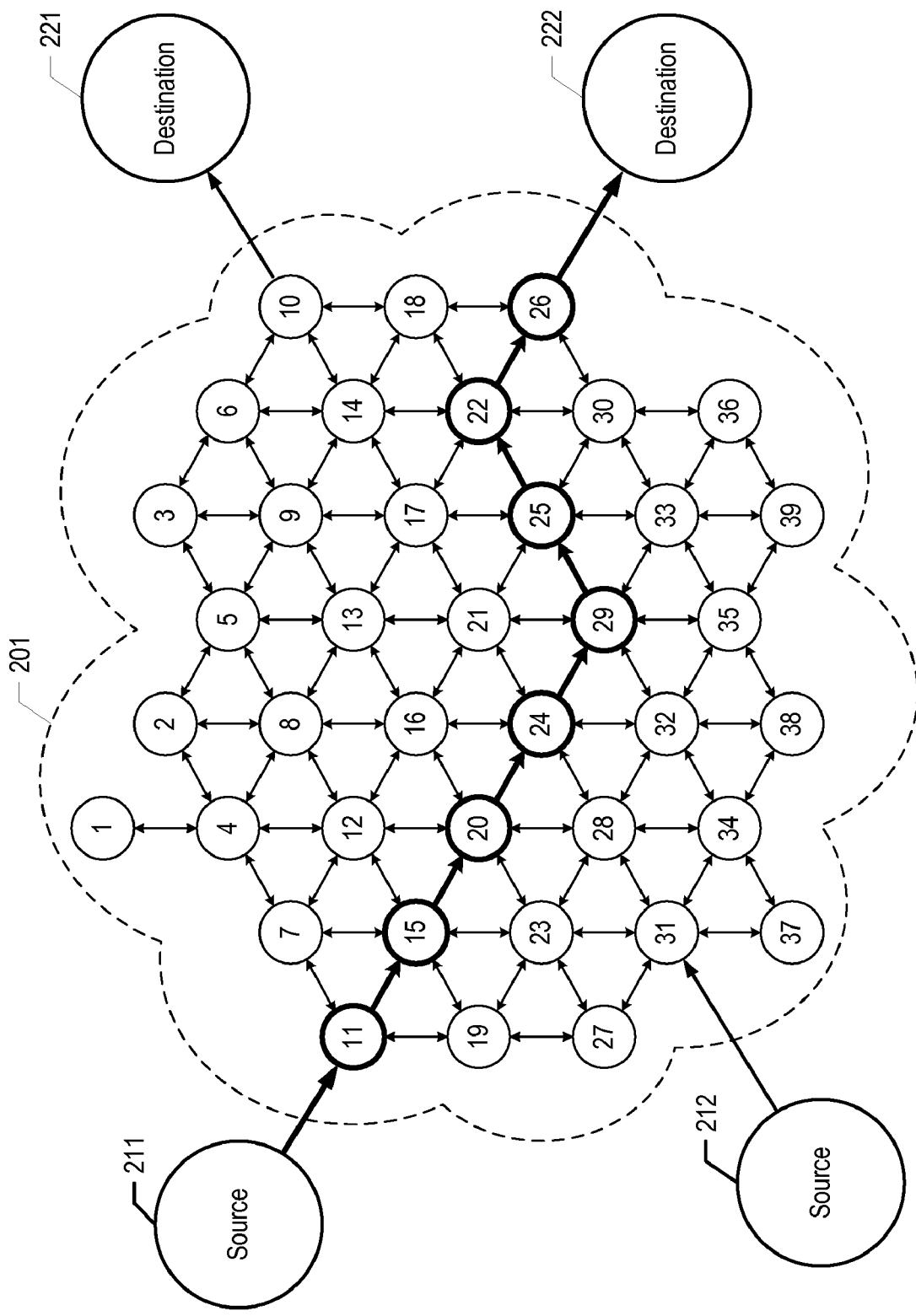
FIG. 3 depicts the primary nominal path through network 201 from source node 211 to destination node 222, which comprises nodes 11, 15, 20, 24, 29, 25, 22, and 26.

FIG. 3 depicts the primary nominal path through network 201 from source node 211 to destination node 222, which comprises nodes 11, 15, 20, 24, 29, 25, 22, and 26. For any pair of source and destination nodes, there always exists one primary nominal path.

When any of the nodes in the primary nominal path are not functioning or are experiencing congestion, a node in the primary nominal path can divert the packet from the primary nominal path onto an "alternative nominal path." For the purposes of this specification, an "alternative nominal path" is defined as a chain of preferred and alternative next nodes from a source node to a destination node.

Figure 4:
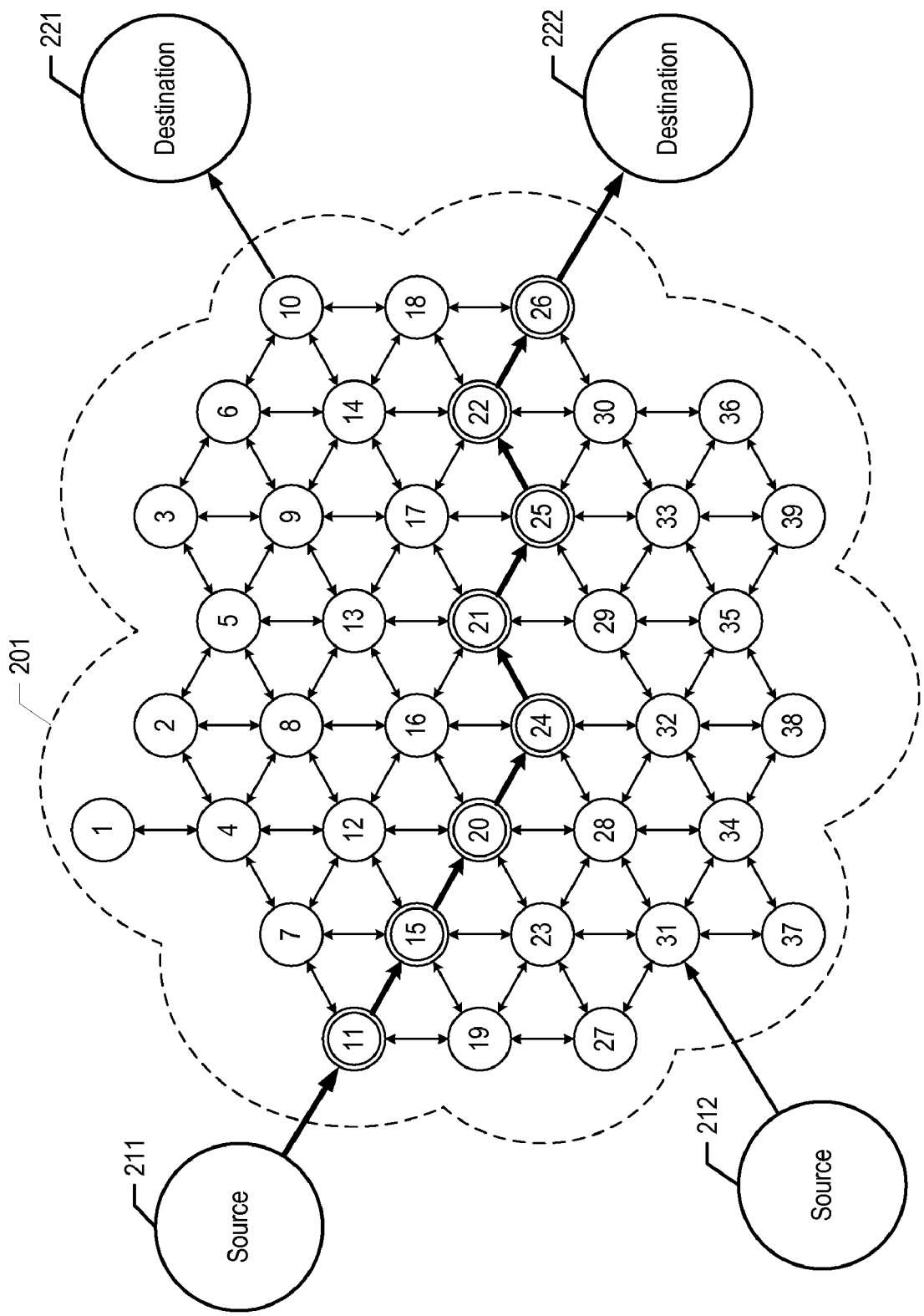
FIG. 4 depicts one alternative nominal path through network 201 from source node 211 to destination node 222.

Because any one of the nodes in the primary nominal path can divert the packet off of the primary nominal path and onto an alternative nominal path, each primary nominal path usually has associated with it a plurality of alternative nominal paths. For example, FIG. 4 depicts one alternative nominal path through network 201 from source node 211 to destination node 222, which bypasses node 29 because of a severed link.

Once the packet has been forwarded onto an alternative nominal path, however, any node in the alternative nominal path can again divert the packet onto yet another alternative nominal path. In some networks, every node in a network is either in (1) the primary nominal path or (2) at least one alternative nominal path. In some other networks, however, there are nodes that are not in either (1) the primary nominal path or (2) any of the alternative nominal paths. The difference depends on:

i. the number of nodes in the network,
ii. the network's topology, and
iii. the number of alternative next nodes in each node's routing table.

It will be clear to those skilled in the art how to determine the primary nominal path and the alternative nominal paths between any two nodes in any network.

Figure 5:
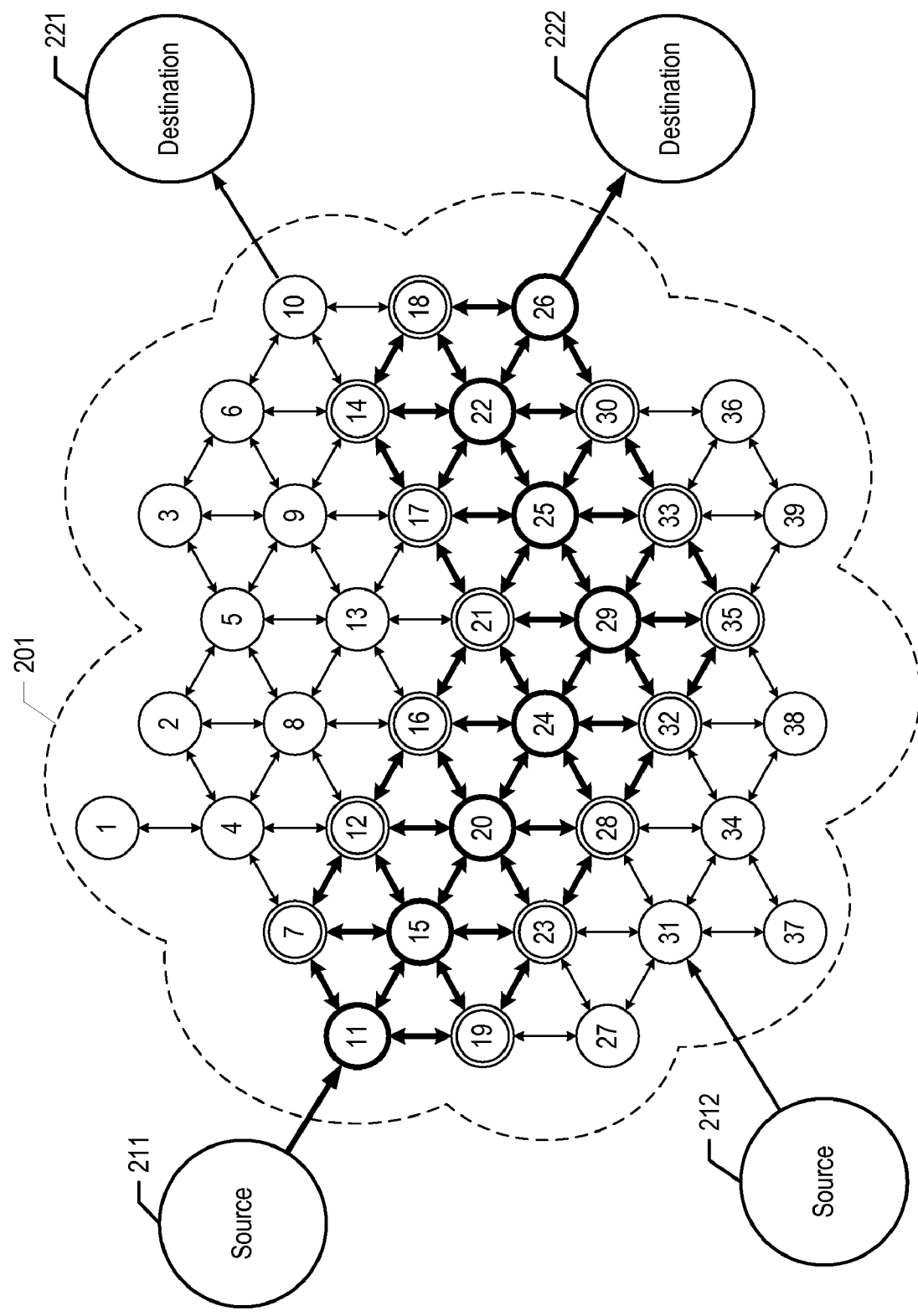
FIG. 5 depicts the primary nominal path and all of the alternative nominal paths through network 201 from source node 211 to destination node 222.

FIG. 5 depicts the primary nominal path and all of the alternative nominal paths through network 201 from source node 211 to destination node 222. For the purposes of this specification, a node in a network that is within the subgraph of nominal paths is defined as a "nominal path node" and a node that is not within the subgraph of nominal paths is defined as an "extranominal path node."

Figure 6:
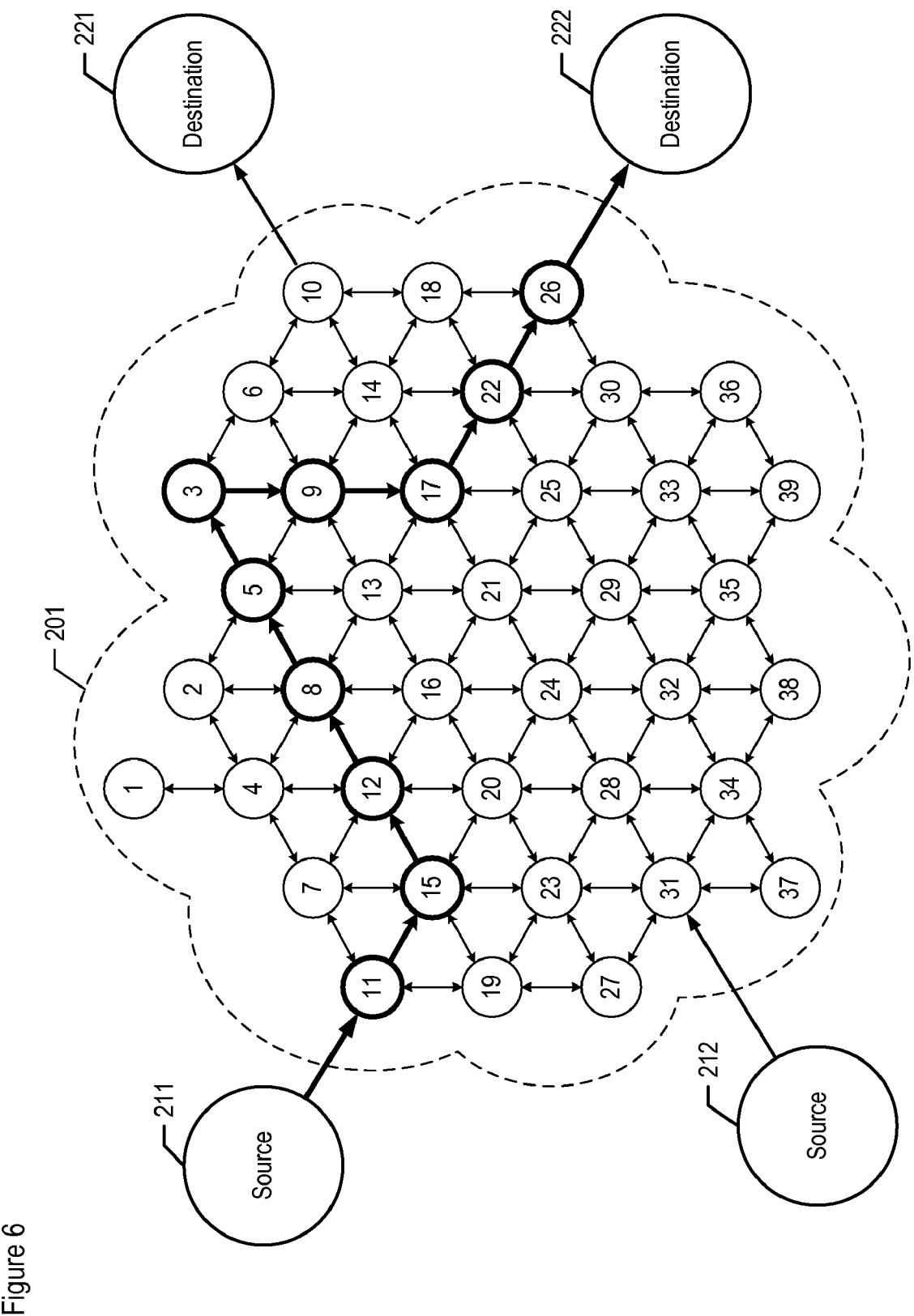
FIG. 6 depicts the use of extranominal node 3 as a relay node for a packet that leaves source node 211 for destination node 222.

FIG. 6 depicts the use of an extranominal path node—in this example, node 3—as a relay node, or "ricochet" node, for a packet that leaves source node 211 for destination node 222. A relay node is addressable by a source node and is able to relay traffic packets between the source and destination nodes that are engaged in a transfer of packets. The relay node enables a source node to intentionally choose an advantageous path for the transmission of a packet or packets. When a relay node receives a packet, the node determines that the received packet is to be forwarded to the destination node whose address has been specified by the source node; for example, the destination node's address can reside within the original packet transmitted to the relay node, which extracts the address and forwards part of the original packet to the destination node.

The effect of having at least one relay node available is that by giving the source node more than one option for routing each packet through network 201, the likelihood is increased that the source node can route the packet through a network path with a satisfactory quality of service. This is in contrast to allowing the packets to be routed through the network purely by using the routing table of each intermediate node.

In this example in which node 3 also serves as a relay node, the packet takes a first path from source node 211 to node 3 and then a second path to destination node 222. The path from source node 211 to destination node 222 through node 3 is indirect, in contrast to one of the nominal paths from source node 211 to destination node 222, because source node 211 specifies node 3 in the packet's path. In other words, when source node 211 specifies an intermediate relay node in the packet's path on its way to destination 222, the packet is taking an indirect path—regardless of whether the relay node is a nominal path node or not.

For the purposes of this specification, the term "indirect" path is defined as a path from a source node to a destination node with a specified relay node, regardless of whether or not the relay node is a nominal path node or not. Some, but not all, indirect paths are nominal paths. Conversely, and for the purposes of this specification, the term "direct" path is defined as a path from a source node to a destination node without a specified relay node. All direct paths are nominal paths.

Network 201 further comprises additional relay nodes. For example, in addition to node 3, nodes 1, 6, 16, 18, 19, 25, 28, 30, and 38 are also relay nodes. Although network 201 in the illustrative embodiment has the 10 nodes already identified that serve as relay nodes, it will be clear to those skilled in the art, after reading this specification, how to make and use embodiments of the present invention in which networks have a different number of nodes that are able to serve as relay nodes. Furthermore, as those who are skilled in the art will appreciate, after reading this specification, some or all of the relay nodes can be dedicated to serving as relays only, while other relay nodes may appear on the routing tables of adjacent nodes, either as preferred next nodes or alternative next nodes. Finally, although each indirect network path in the illustrative embodiment has exactly one relay node, it will be clear to those skilled in the art how to make and use embodiments in which an indirect network path has more than one relay node in its path.

Before source node 211 specifies a relay node such as node 3 in the packet's path and transmits the packet, node 211—or some other node that handles the quality-of-service evaluations, for that matter—evaluates the quality of service of the indirect network path through the relay node. The evaluation can be performed with respect to the qualities of service of other indirect paths being evaluated or with respect to that of a direct network path in use. Node 211 evaluates the quality of service to see if the quality of service of the indirect path is sufficient.

Source node 211, for example, can acquire quality-of-service information for the direct path by transmitting a time-stamped test packet to destination node 222 with an instruction to destination 222 to time stamp the test packet again and return the results to source node 211. The general technique of transmitting a test packet and receiving performance-related results based on the test packet is referred to as "probing" and can be repeated, either sporadically or periodically, for each network path being tested. Alternatively, source 211 can acquire quality-of-service information for the direct path by using the actual, real-time stream of transmitted RTP (i.e., Real-time Transport Protocol) traffic packets to test the path; in this way, the RTP stream serves as a "free" probing stream, as the RTP packets comprise timestamp information. The technique of probing, as well as the acquisition of quality-of-service information associated with one or more indirect network paths, is described in additional detail in U.S. patent application Ser. No. 11/329,933, filed on Jan. 11, 2006, which is incorporated herein by reference.

Figure 7:
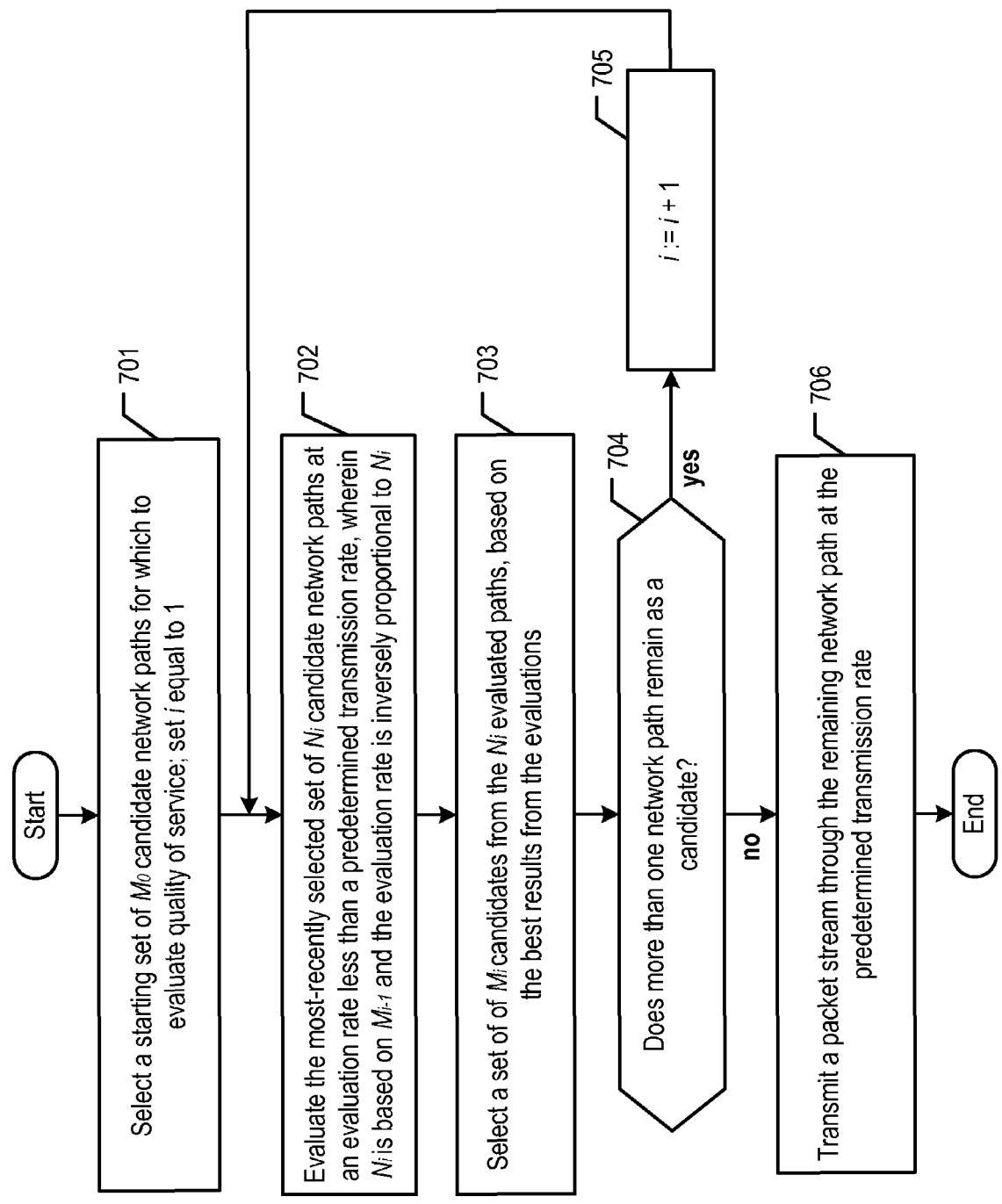
FIG. 7 depicts a flowchart of the salient tasks associated with the operation of the illustrative embodiment of the present invention.

FIG. 7 depicts a flowchart of the salient tasks associated with the evaluation and selection of a network path to be used to transmit a packet stream at a predetermined transmission rate, in accordance with the illustrative embodiment of the present invention. The predetermined transmission rate is typically the rate at which real-time traffic packets (e.g., VoIP packets, etc.) will be transmitted, once the evaluation and selection process has yielded a result.

In the example depicted in FIG. 7, source node 211 is transmitting a packet stream to destination node 222 and is also evaluating and selecting one or more candidate network paths (e.g., indirect network paths, etc.) for the purpose of transmitting the packet stream via the selected path or paths. As those who are skilled in the art will appreciate, in some alternative embodiments, a node other than source node 211 can evaluate and/or select the network path to transmit a packet stream. Furthermore, as those who are skilled in the art will appreciate, some or all of the depicted tasks can be combined or performed in a different order than that depicted.

At task 701, source node 211 selects an initial set of $M_0$ candidate network paths to evaluate as candidates over which to transfer packets. The initial set of paths might comprise all of the source node-addressable paths available within network 201 or might consist of a subset of those paths. As those who are skilled in the art will appreciate, various techniques can be used to select the initial set that does not comprise the entire set of candidate paths within a network, such as through a random selection, through a selection based on past results, through a selection based on topology information, and so forth.

For pedagogical purposes, indirect network paths are exclusively selected to be in the initial set of candidate paths. As described earlier, nodes 1, 3, 6, 16, 18, 19, 25, 28, 30, and 38 are the relay nodes available within network 201. In this example, the indirect network paths that correspond to nodes 1, 3, 16, 18, 25, 28, 30, and 38 (i.e., 8 of the 10 relay nodes) are selected as the initial set of candidate network paths, and are selected based on past results. As those who are skilled in the art will appreciate, path types other than indirect paths can be selected to be included in the initial set of candidates.

In some embodiments, source node 211 also establishes an evaluation bit budget, which can be based on the predetermined transmission rate. The bit budget serves to manage the total number of evaluation bits that will be transmitted in probing for the best path within a set of candidate paths.

The evaluation and selection of candidate paths is an iterative process, in which a currently-evaluated set of candidate paths depends on a previously-selected set of candidates. Accordingly, in order to track the iterations, index i is initially set to 1.

At task 702, source node 211 evaluates the signal quality associated with each candidate network path $P_n$ of the $N_i$ network paths currently remaining as candidates, from source node 211 to destination node 222. The value for $N_i$ is based on $M_{i-1}$; in accordance with the illustrative embodiment, $N_i$ is equal to $M_{i-1}$. In the example, each path $P_n$ comprises relay node $R_n$ that defines indirect path $P_n$ and, as such, serves to distinguish each candidate network path from the others. For instance, the relay node $R_1$ that defines path $P_1$ might be node 1 in network 201, the relay node $R_2$ that defines path $P_2$ might be node 3, and so forth. In some alternative embodiments, path $P_n$ is defined by something other than relay node $R_n$.

As is well known to those skilled in the art, one aspect of signal quality is the quality of service of a path, which is measured by:
  i. bandwidth, or
  ii. error rate, or
  iii. latency, or
  iv. a derivative or associated function of bandwidth, or
  v. a derivative or associated function of error rate (e.g., packet loss, etc.), or
  vi. a derivative or associated function of latency (e.g., jitter, etc.), or
  vii. any combination of i, ii, iii, iv, v, and vi.

As noted earlier, source node 211 can, for example, evaluate the quality of service of a path by transmitting a time-stamped test packet to destination node 222 via the relay node of the particular network path of interest, with an instruction to destination 222 to time stamp the test packet again and return the results to source node 211.

In some embodiments, source node 211 can also evaluate signal quality in terms of the "waveform quality" of the media signal that is conveyed in a packet stream. The waveform quality is a measure of how well a media signal that is received at a device compares with what is required to be received at that device, when assessed at the waveform level. A media signal can be an audio signal, a video signal, a modem traffic signal, a TTY signal, a facsimile signal, or some other signal that can be characterized as having a waveform. The device can be the intended destination of the media signal within a telecommunications system or it can be an intermediate node within the telecommunications system. Waveform quality is distinguished from quality of service, in that quality of service is a measure that is performed at the packet level. Waveform quality is a function of, but is not limited to, one or more of the following waveform characteristics:

i. loudness,
  ii. audio distortion,
  iii. noise,
  iv. fading,
  v. crosstalk,
  vi. echo, and
  vii. video distortion (e.g., spatial, temporal, optical, etc.).

It will be clear to those skilled in the art how to evaluate for waveform quality.

The evaluation of each path $P_n$, at least for one of the evaluated paths, involves transmitting packets at an evaluation rate that is less than the predetermined transmission rate, in accordance with the illustrative embodiment of the present invention. In some embodiments, the evaluation rate is less than or equal to one-half of the predetermined transmission rate. Furthermore, in accordance with the illustrative embodiment, the evaluation rate is inversely proportional to $N_i$. For instance, the evaluation rate might be one-eighth rate when eight candidate paths remain, one-fourth rate when four candidate paths remain, and so forth. In some embodiments, the evaluation rate is less than or equal to the predetermined transmission rate divided by $N_i$, while in some other embodiments the rate is exactly equal to the predetermined transmission rate divided by $N_i$. As those who are skilled in the art will appreciate, in some alternative embodiments the evaluation rate might have some other relationship with respect to the predetermined transmission rate.

For a given iteration, in some embodiments, the evaluation bit rates used for some of the candidate paths can be greater than those used in the illustrative embodiment, or at least can be different from one another, while staying within the overall evaluation bit budget established at task 701.

The evaluation of each path $P_n$, at least for one of the paths, also involves transmitting packets for a duration that is short enough to minimize the additional traffic imposed on the network, while being long enough to yield meaningful results. For example, a longer duration might apply when a lower evaluation rate is used. As those who are skilled in the art will appreciate, the duration can be based on considerations other than the evaluation rate.

In accordance with the illustrative embodiment, all of the candidate paths are evaluated concurrently. In other words, source node 211—or another node that is coordinating the evaluation—is transmitting, receiving, waiting for, or updating measurements for evaluation-related packets on all of the $N_i$ candidate network paths. In some alternative embodiments, source node 211 performs the evaluation concurrently on only a subset (e.g., two paths, etc.) of the $N_i$ candidate network paths and sequentially evaluates the others.

At task 703, source node 211 selects $M_i$ candidate network paths from the $N_i$ candidate network paths evaluated, based on the results (e.g., quality-of-service, waveform quality, etc.) from the evaluation performed at task 702. In accordance with the illustrative embodiment, the candidate network paths with the best $M_i$ quality-of-service results are selected. In some embodiments, the value of $M_i$ is less than or equal to one-half of the value of $N_i$, while in some other embodiments the value of $M_i$ can be exactly equal to one-half of the value of $N_i$, while in still some other embodiments the value of $M_i$ can vary with respect to $N_i$.

At task 704, source node 211 checks if more than one candidate path remains as a candidate for further evaluation. If more than one path remains, task execution proceeds to task 705. Otherwise, task execution proceeds to task 706.

At task 705, source node 211 increments index i. Task execution then proceeds to task 702, in order to evaluate the remaining paths in the ith iteration of the described evaluation and selection tasks.

At task 706, source node 211 transmits one or more packets, as part of a packet stream (e.g., a VoIP packet stream, etc.), to destination node 222 through the network path that remained as a candidate for transmission after the iterative evaluation-and-selection procedure of the illustrative embodiment. Source node 211 transmits the packet stream at the predetermined transmission rate, in accordance with the illustrative embodiment. It will be clear to those skilled in the art how to make and use alternative embodiments in which source node 211 transmits the packet stream at a different rate than the predetermined rate or at a variable rate relative to the predetermined rate.

In some alternative embodiments, prior to transmitting the packet stream at task 706, source node 211 first tests the selected network path by transmitting evaluation packets at or near the predetermined transmission rate and then evaluates the results. If the path is unsatisfactory, node 211 may recall one or more of the previously discarded candidate paths and re-evaluate and select from them. Otherwise, node 211 proceeds to transmit the packet stream via the selected network path.

After task 706, task execution ends, at least for the current set of real-time traffic packets being transmitted. As those who are skilled in the art will appreciate, the tasks depicted in FIG. 7 can be invoked repeatedly, sporadically or periodically, in order to continually monitor the signal quality available through different parts of network 201 and to accommodate additional packets to be transmitted from source node 211 to destination node 222.

The following scenario provides an example of how the illustrative embodiment of the present invention works. In the example, there are 16 relay nodes associated with network 201, each path comprising one relay node, where each relay node is different for the different paths. The candidate network paths are to be evaluated to eventually select the candidate network path to carry a packet stream. Although 16 candidate network paths are evaluated, with one relay node per path, it will be clear to those skilled in the art how to make and use embodiments with other than 16 candidate network paths to be evaluated or with other than one relay node being associated with each path, or both.

In the first iteration, the 16 candidate network paths are simultaneously evaluated with sixteenth-rate packet stream signals, where the evaluation rate is expressed in terms of the intended transmission rate of the real-time traffic signals. Although there are 16 signals probing network 201, the fact that they are only at sixteenth-rate means that they only create as much congestion in network 201 as roughly one full-rate signal. However, the results of evaluations with a sixteenth-rate signal yield a good, but not perfect, indication of how a full-rate signal would perform; consequently, the results are not reliable enough to make an informed decision on which candidate network path to select to carry the real-time traffic signals. Therefore, at least one additional set of evaluations is required, as part of a second iteration.

In the second iteration, the eight candidate network paths with the best results from the first iteration are selected to be concurrently checked with eighth-rate packet stream signals. Although the probing signals increase packet traffic in the network, there are only eight of them, which only create as much congestion in network 201 as one full-rate signal. Although the results from the eighth-rate signals are more reliable than the results from the sixteenth-rate signals, they are not reliable enough to make an informed decision on which candidate network path to select. Therefore, at least one additional set of evaluations is required, as part of a third iteration.

In the third iteration, the four candidate network paths with the best results from the second iteration are simultaneously checked with quarter-rate packet stream signals. Although the probing signals increase packet traffic in the network, there are only four of them, which only create as much congestion in network 201 as one full-rate signal. Although the results from the quarter-rate signals are more reliable than the results from the eighth-rate signals, they are not reliable enough to make an informed decision on which candidate network path to select. Therefore, at least one additional set of evaluations is required, as part of a fourth iteration.

In the fourth iteration, the two candidate network paths with the best results from the third iteration are simultaneously checked with half-rate packet stream signals. Although the probing signals increase packet traffic in the network, there are only two of them, which only create as much congestion in network 201 as one full-rate signal. The candidate network path with the best result of this iteration is chosen as the new network path through which to transfer a stream of packets.

In this way, the technique of the illustrative embodiment selects a path quickly and reliably while mitigating additional congestion in the network.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   establishing an evaluation bit budget that is based on a predetermined transmission rate at which a first packet stream is to be transmitted from a first node to a second node;
   iteratively evaluating signal quality that is associated with each network path $P_n$ of $N_i$ network paths for each iteration i, from the first node to the second node, $N_i$ being an integer greater than one and n being an integer between 1 and $N_i$, wherein the evaluation of at least one path $P_n$ involves transmitting bits at an evaluation rate that is based on the evaluation bit budget, and wherein the total number of bits transmitted for all evaluations is based on the evaluation bit budget;
   after each iteration i of the evaluation, selecting an $i^{th}$ subset of network paths from the $N_i$ network paths, wherein the selection is based on the signal quality results from the evaluation of the $N_i$ network paths; and
   transmitting, at the predetermined transmission rate, the first packet stream from the first node to a third node, wherein the third node is in path $P_s$ that is selected after the final iteration.

2. The method of claim 1 wherein the evaluation rate in effect for iteration i is less than or equal to one-half of the predetermined transmission rate.

3. The method of claim 2 wherein the evaluation rate in effect for iteration i is less than or equal to the predetermined transmission rate divided by $N_i$.

4. The method of claim 3 wherein the number of network paths in the $i^{th}$ subset is less than or equal to one-half of the value of $N_i$.

5. The method of claim 1 wherein at least two of the $N_i$ network paths are evaluated concurrently for iteration i.

6. The method of claim 5 wherein all of the $N_i$ network paths are evaluated concurrently for iteration i.

7. The method of claim 1 wherein the selection of the $i^{th}$ subset of network paths is based on the network paths that have the best quality-of-service results from the evaluation at iteration i.

8. A method comprising:
   evaluating signal quality that is associated with each network path $P_n$ of N network paths from a first node to a second node, in support of a first packet stream to be transmitted at a predetermined transmission rate from the first node to the second node, N being an integer greater than one and n being an integer between 1 and N, wherein the evaluation of at least one path $P_n$ involves transmitting bits at an evaluation rate that is i) less than the predetermined transmission rate and ii) inversely proportional to N, and wherein at least one of the paths fails to provide a quality-of-service guarantee;
   selecting M network paths from the N network paths, M being a positive integer that has a value less than N, wherein the selection is based on the signal quality results from the evaluation of the N network paths; and
   transmitting, at the predetermined transmission rate, the first packet stream from the first node to a third node, wherein the third node is in selected path $P_s$ that is one of the M network paths.

9. The method of claim 8 wherein the evaluation rate is less than or equal to one-half of the predetermined transmission rate.

10. The method of claim 9 wherein the evaluation rate is less than or equal to the predetermined transmission rate divided by N.

11. The method of claim 10 wherein the value of M is less than or equal to one-half of the value of N.

12. The method of claim 8 wherein at least two of the N network paths are evaluated concurrently.

13. The method of claim 12 wherein all of the N network paths are evaluated concurrently.

14. The method of claim 8 wherein the selection is based on the M network paths having the best quality-of-service results from the evaluation.

15. The method of claim 8 further comprising:
   evaluating quality-of-service that is associated with each network path $P_m$ of the M network paths; and selecting Q network paths from the M network paths, Q being a positive integer that has a value less than or equal to the value of M, wherein the selection is based on the Q network paths having the best quality-of-service results from the evaluation of the M network paths.

16. A method comprising:

evaluating quality-of-service that is associated with each network path $P_n$ of N network paths from a first node to a second node, in support of a first packet stream to be transmitted at a predetermined transmission rate from the first node to the second node, N being an integer greater than one and n being an integer between 1 and N, each path $P_n$ comprising relay node $R_n$ that defines path $P_n$, wherein the evaluation of at least one path $P_n$ involves transmitting bits at an evaluation rate that is less than or equal to the predetermined transmission rate divided by N, and wherein at least one path $P_n$ fails to provide a quality-of-service guarantee;

selecting M network paths from the N network paths, M being a positive integer that has a value less than or equal to one-half of the value of N, wherein the selection is based on the quality-of-service results from the evaluation of the N network paths; and transmitting, at the predetermined transmission rate, the first packet stream from the first node to relay node $R_s$ in selected path $P_s$ that is one of the M network paths.

17. The method of claim 16 wherein the evaluation rate is equal to the predetermined transmission rate divided by N.

18. The method of claim 17 wherein the value of M is equal to one-half of the value of N.

19. The method of claim 16 wherein at least two of the N network paths are evaluated concurrently.

20. The method of claim 19 wherein all of the N network paths are evaluated concurrently.

21. The method of claim 16 wherein the selection is based on the M network paths having the best quality-of-service results from the evaluation.

22. The method of claim 16 further comprising:

evaluating the quality of service associated with each network path $P_m$ of the M network paths; and selecting Q network paths from the M network paths, Q being a positive integer that has a value less than or equal to the value of M, wherein the selection is based on the Q network paths having the best quality-of-service results from the evaluation of the M network paths.

23. A method comprising:

performing a first evaluation of quality-of-service that is associated with each network path $P_n$ of network paths $P_1$ through $P_4$ from a first node to a second node, in support of a first packet stream to be transmitted at a predetermined transmission rate from the first node to the second node, each path $P_n$ of paths $P_1$ through $P_4$ comprising relay node $R_n$ that defines path $P_n$, wherein the evaluation of at least one path $P_n$ involves transmitting bits at a first evaluation rate that is equal to one-quarter of the predetermined transmission rate, and wherein at least one path $P_n$ fails to provide a quality-of-service guarantee;

selecting two network paths $P_1$ and $P_2$ from paths $P_1$ through $P_4$, wherein the selection is based on paths $P_1$ and $P_2$ having the best quality-of-service results from the first evaluation;

performing a second evaluation of the quality of service associated with paths $P_1$ and $P_2$ at a second evaluation rate that is equal to one-half of the predetermined transmission rate;

selecting one network path $P_1$ from paths $P_1$ and $P_2$, wherein the selection is based on path $P_1$ having the best quality-of-service results from the second evaluation; and transmitting, at the predetermined transmission rate, the first packet stream from the first node to relay node $R_1$ in path $P_1$.

24. The method of claim 23 wherein at least two of network paths $P_1$ through $P_4$ are evaluated concurrently in the first evaluation.

25. The method of claim 24 wherein all of network paths $P_1$ through $P_4$ are evaluated concurrently in the first evaluation.

26. The method of claim 23 further comprising:

performing a third evaluation of the quality of service associated with each network path $P_n$ of N network paths from the first node to the second node, N being an integer greater than four; and selecting the four network paths $P_1$ through $P_4$ from the N network paths, wherein the selection is based on paths $P_1$ through $P_4$ having the best quality-of-service results from the third evaluation.

27. The method of claim 26 wherein all of the N network paths are evaluated concurrently in the third evaluation.

\* \* \* \* \*